United States Patent
O'Dea et al.

(10) Patent No.: US 6,373,901 B1
(45) Date of Patent: Apr. 16, 2002

(54) METHOD AND APPARATUS FOR CONDITIONING MODULATED SIGNALS USING WINDOW EXPANSION

(75) Inventors: Robert J. O'Dea, Ft. Lauderdale; Robert E. Stengel, Pompano Beach, both of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/627,537

(22) Filed: Apr. 4, 1996

(51) Int. Cl.⁷ .......................... H04L 25/03; H04L 27/20; H04L 27/36
(52) U.S. Cl. ........................ 375/296; 375/308; 332/103; 332/123; 332/159
(58) Field of Search ................................ 375/261, 271, 375/279, 280, 281, 283, 284, 285, 296, 298, 302, 308, 297; 332/103, 123, 159

(56) References Cited

U.S. PATENT DOCUMENTS

| | | | | |
|---|---|---|---|---|
| 4,646,326 A | | 2/1987 | Backof, Jr. et al. | 375/261 |
| 5,287,387 A | * | 2/1994 | Birchler | 375/296 |
| 5,319,676 A | * | 6/1994 | Van Dasler et al. | 375/296 |
| 5,579,342 A | * | 11/1996 | Crozier | 375/296 |
| 5,606,578 A | * | 2/1997 | O'Dea | 375/298 |
| 5,638,404 A | * | 6/1997 | Crozier | 375/296 |
| 5,642,384 A | * | 6/1997 | Ramesh | 375/265 |
| 5,696,794 A | * | 12/1997 | O'Dea | 375/296 |
| 5,805,640 A | * | 9/1998 | O'Dea et al. | 375/296 |

FOREIGN PATENT DOCUMENTS

WO WO 97/38503 * 10/1997

\* cited by examiner

Primary Examiner—Young T. Tse
(74) Attorney, Agent, or Firm—Andrew S. Fuller; Frank M. Scutch, III

(57) ABSTRACT

A modulated signal, having a varying magnitude signal envelope, is conditioned, such as to facilitate amplification (500). Minimum values are determined values for portions of the signal envelope (520, 530), and a window expansion function applied to scale each portion of the signal envelope having a minimum value below a particular threshold, such that each scaled portion has a new minimum value of at least the particular threshold (535, 540, 550, 555).

20 Claims, 4 Drawing Sheets

METHOD AND APPARATUS FOR CONDITIONING MODULATED SIGNALS USING WINDOW EXPANSION

TECHNICAL FIELD

This invention relates in general to communication systems, and more particularly, to the conditioning of a modulated signal, such as for amplification purposes.

BACKGROUND

Contemporary communication systems often employ modulated signals to effect communications. For example, in a typical digital radio communication device, the transmitted source information is represented by a digital information stream. This digital information stream is modulated and amplified for transmission over a communication channel. Many complex digital modulation schemes have been developed to efficiently convey information across a communication channel. Depending on the digital modulation scheme used, a resultant transmitted signal may have a signal envelope with substantial variation or dynamic range. The dynamic range of the transmitted signal envelope affects the design and selection of a power amplifier used to amplify the communication signals before transmission.

Typically, the power amplifier must accommodate the variations in the signal envelope without distorting the transmitted signal. Distortion of the transmitted signal can cause undesirable effects, such as spectral spreading of the signal energy into adjacent communication channels and degradation to the receiver sensitivity. To avoid signal distortion, the power amplifier is designed to linearly amplify the transmitted signal over its complete dynamic range.

The operating characteristics of conventional power amplifiers dictate that the amplifier efficiency increases monotonically with the value of the signal envelope. A constant signal envelope modulation, such as frequency modulation (FM), allows a power amplifier to be designed to operate continuously at peak efficiency. However, when the value of the transmitted signal envelope varies with time, the overall amplifier efficiency will be significantly less than peak efficiency. In a battery powered communication device, this reduction in amplifier efficiency results in reduced battery life. Amplifiers that accommodate large signal dynamic ranges are also relatively expensive to develop and produce, when compared to amplifiers for constant signal envelope signals.

Known power amplification techniques such as Doherty, Supply Modulation, and LINC (linear amplification with nonlinear components), are designed to amplify signals having a varying signal envelope without distorting the signal, while simultaneously providing improved power efficiency. However, with these amplification techniques, it is expensive to accommodate signals with a large dynamic range while maintaining good performance. Consequently, use of a particular modulation scheme with a varying signal envelope may preclude the selection of certain amplifier designs because of cost and performance issues.

The reduction of power consumption has become an increasingly important aspect of the design of a radio communication device. The provision of an efficient power amplification for transmitted signals is a critical component in reducing power consumption. However, some modulation schemes used to maximize spectral efficiency may have 60 decibels or more amplitude dynamic range, which limits the ability to use efficient amplification techniques. It is desirable to facilitate the efficient amplification of modulated signals while avoiding problems associated with prior art devices.

DETAILED DESCRIPTION OF THE PREFERRED EMBODIMENTS

The present invention provides for the conditioning of a modulated signal, such as to enhance amplifier performance in a transmitter. The modulated signal is conditioned by expanding, using a window function, selected portions of the signal envelope that have signal envelope magnitudes below a threshold value. In the preferred embodiment, a digitally modulated signal is providing by mapping digital source information onto a symbol constellation, corresponding to a particular modulation scheme, to generate a sequence of channel symbols. The modulated signal is processed by a spectral shaping filter and the resultant signal envelope analyzed to determine minimum values of the signal envelope as the modulated signal transitions between successive channel symbols of the sequence. A conditioned signal is generated from the modulated signal by adjusting portions of the signal envelope to avoid signal envelope minimum values below the threshold value. Adjustments to the signal envelope are made using a window algorithm that proportionally increases the minimum value of a particular portion of the signal envelope between two successive channel symbols, when the particular portion has a minimum value below the threshold value.

Figure 1:
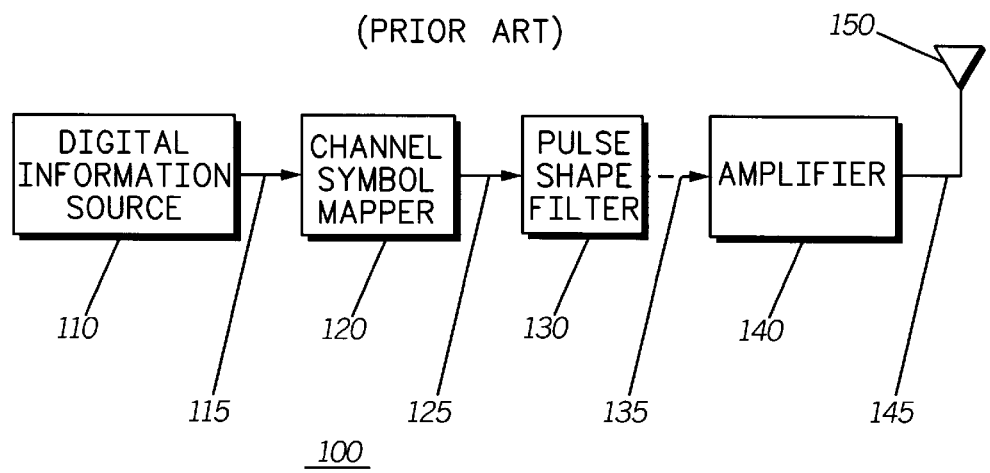
FIG. 1 is a block diagram of a portion of a prior art communication device for transmitting digitally modulated signals.

Referring to FIG. 1, a prior art communication device 100 is shown, that incorporates elements commonly found in a device providing linear transmission of digitally modulated signals. The communication device 100 includes a digital information source 110, such as a voice encoder, that generates a stream of digital information 115. A channel symbol mapper 120 is coupled to the stream of information 115 and provides digital modulation. In the example shown, a linear modulation scheme such as Quadrature Amplitude Modulation (QAM) is used. The QAM signaling scheme utilizes both the phase and amplitude of a carrier signal to transmit information, and has a relatively high peak-to-average power ratio. The channel symbol mapper 120 outputs a modulated signal comprising a sequence of channel symbols 125, and the modulated signal is coupled to a pulse shape filter 130. The pulse shape filter 130 provides a bandwidth limiting function to limit the signal spectrum. The filter 130 outputs a digitally filtered signal 135 which is ultimately coupled to an amplifier 140. The amplifier 140 outputs an amplified signal 145 that is radiated through an antenna 150.

Figure 2:
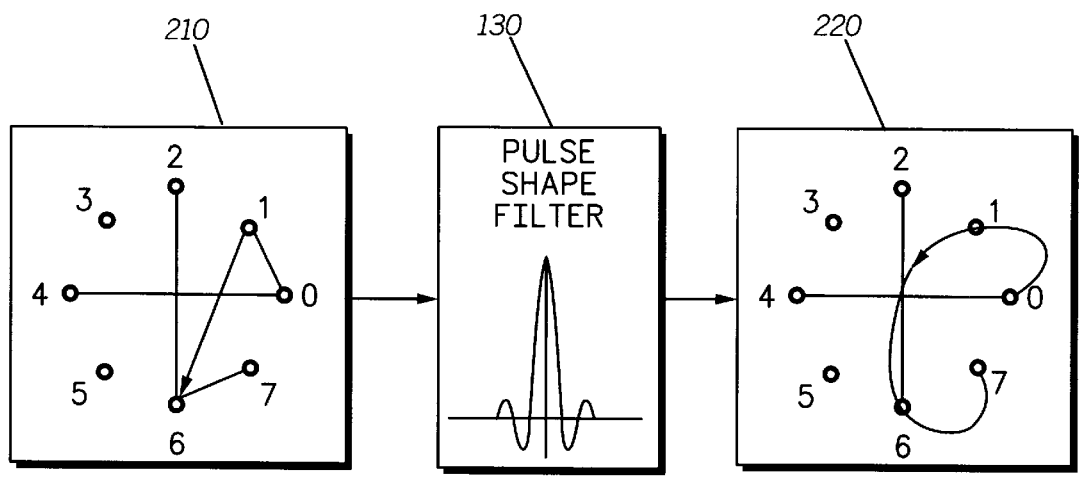
FIG. 2 is a depicting the impact of pulse shape filtering on the digitally modulated signal in the prior art device of FIG. 1.

FIG. 2 shows a graphical representation 200 of the impact of the pulse shape filter in the prior art communication device 100. For the purposes of illustration, it is assumed that a π/4 quadrature phase shift keying (QPSK) modulation scheme is employed. As is common in the art, a symbol constellation for a π/4 QPSK modulation scheme can be represented graphically as a set of symbols in a two-dimensional structure representing phase and amplitude. Graphical block 210 is a representation of a channel symbol sequence having values {0, 1, 6, 7} generated by the channel symbol mapper 120 to represent a sample digital information stream. Note that in this modulation scheme, straight line transitions between successive symbols do not cross the origin, i.e., no transition has a point at which the amplitude and phase have a value of zero(0).

Figure 3:
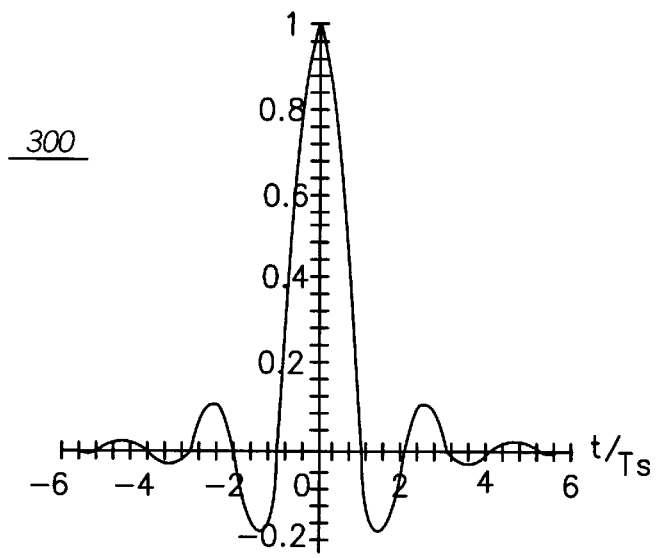
FIG. 3 is a graph depicting the time domain response of a pulse shape filter.

As in a typical implementation incorporating the π/4 QPSK modulation scheme, the filter 130 is a raised cosine rolloff pulse shape filter with a predetermined rolloff factor. FIG. 3 is a graph 300 showing a time domain response of the filter 130. The output of the filter 130 is expected to include superimposed responses of the filter to multiple channel symbols. Assume that the sequence of symbols has a symbol period $T_s$ representing the time between successive symbols. A pulse from the pulse shape filter crosses zero at multiples of the symbol period $T_s$, and the value of the composite signal at multiples of $T_s$ will be equal to the channel symbol corresponding to that symbol time. A minimum value of the signal envelope will occur between symbol transitions.

Graphical block 220 is a representation of the signal envelope or signal trajectory representing the sequence of channel symbols {0, 1, 6, 7} after being processed by the pulse shape filter 130. When pulse shape filtering is applied to the sequence of channel symbols to limit signal spectrum, certain symbol transitions can cause the signal envelope to have a very small value. This is primarily due to the characteristic ringing of the pulse shape filter, which causes the signal phase and amplitude, during symbol transitions, to be a function of multiple symbols. Thus, the straight transitions between channel symbols, as evidenced in graph 210, are replaced by random non-linear transitions that produce extremely small signal envelope values. This impact of filtering increases as the filter rolloff factor or signal bandwidth is reduced.

In the example shown, the signal envelope for the symbol sequence {0, 1, 6, 7} takes a path that passes near the origin during the transition from channel symbol {1} to channel symbol {6}. Extremely small values of the signal envelope makes difficult the use of highly efficient linear amplification techniques such as supply modulation LINC and contribute to decoding errors when certain differential detection techniques are employed to process transmitted signals at a receiver.

For the purposes of this discussion, the portion of the signal envelope occurring during the transition between one channel symbol and a successive channel symbol is referred to herein as a symbol interval. A symbol interval minimum is defined, with respect to a particular symbol interval, as the minimum value of the signal envelope during the particular symbol interval. This minimum value is determined by the minimum distance from the origin to the trajectory of the signal envelope during the symbol interval.

According to the present invention, the modulated signal is processed or conditioned, preferably based on the impact of the spectral shaping filter used to filter the modulated signal, to avoid modulated signal envelope values below a particular minimum threshold. Such signal conditioning facilitates the use of efficient linear amplification techniques requiring a limited dynamic range.

Figure 4:
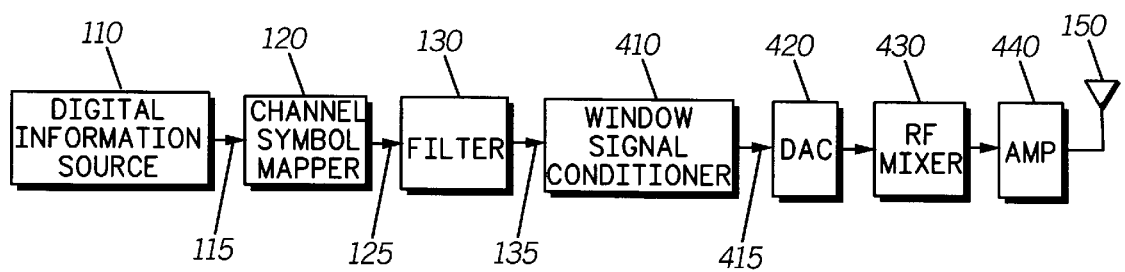
FIG. 4 is a block diagram of a transmitter portion of a communication device incorporating a window signal conditioner, in accordance with the present invention.

FIG. 4 is a block diagram of a transmitter portion of a digital communication device, in accordance with the present invention. As in the prior art device 100 (FIG. 1), the device 400 includes a digital information source 110, a channel symbol mapper 120, a filter 130, and an antenna 150, having all the functions as previously described. A window signal conditioner 410, preferably coupled to the output of the filter 130, provides a conditioned signal 415. The device 400 further includes a digital-to-analog converter (DAC) 420, coupled to the conditioned signal generated by the window signal conditioner 410. A radio frequency (RF) mixer 430 is coupled at the output of the digital to analog converter 420, and a high efficiency linear amplifier 440, such as a LINC amplifier, coupled to the output of the RF mixer 430. The output of the amplifier 440 is coupled to the antenna 150.

The window signal conditioner 410 modifies or conditions a modulated signal, particularly one processed by a spectral shaping filter, to avoid signal envelope values for the modulated signal below a particular threshold. The window signal conditioner 410 mitigates the impact of the filter 130 on the dynamic range of the modulated signal by establishing a floor for the signal envelope of the filtered modulated signal.

Figure 5:
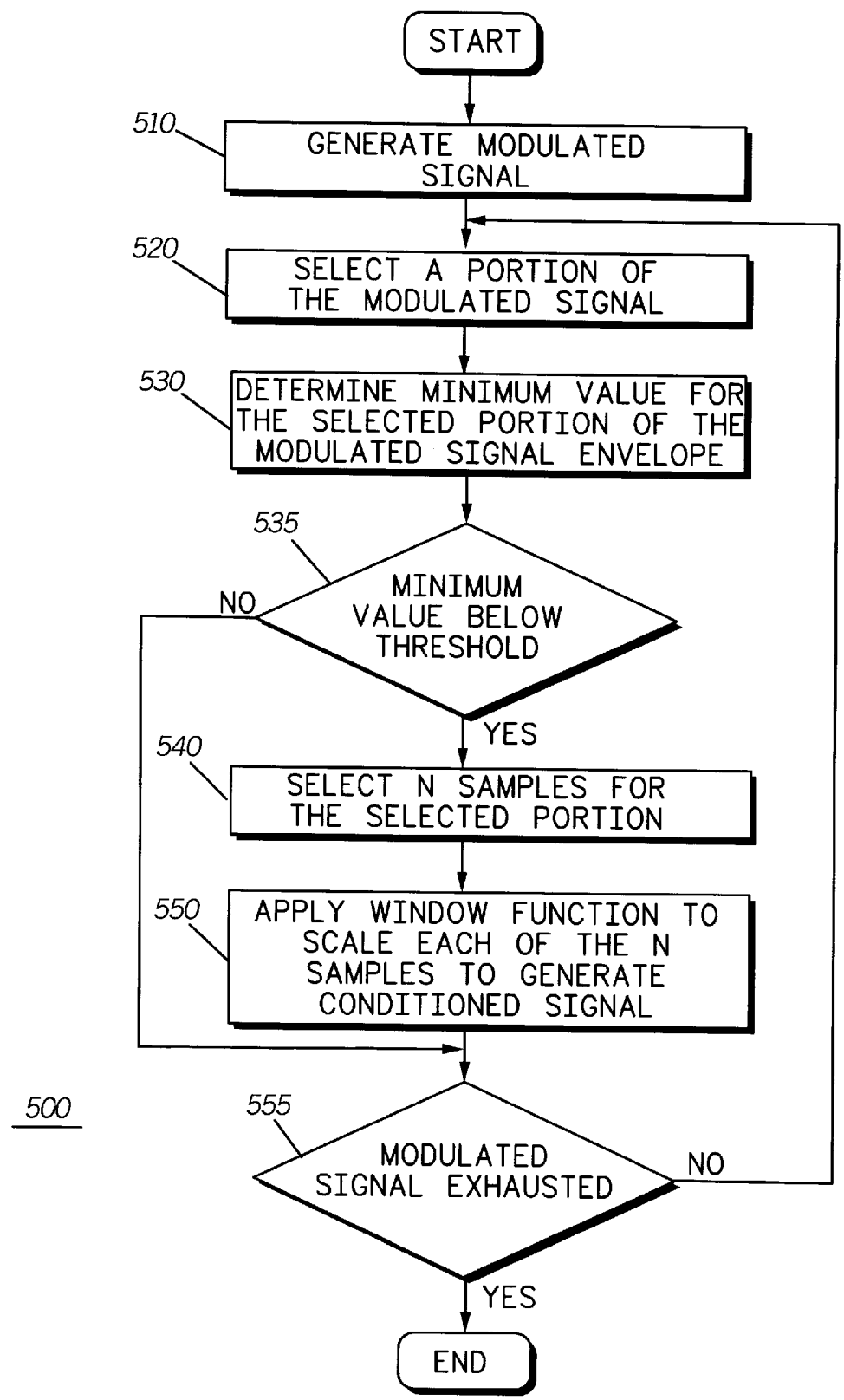
FIG. 5 is a flowchart of procedures for operating the window signal conditioner, in accordance with the present invention.

FIG. 5 is a flowchart of procedures 500 for operating the window signal conditioner, in accordance with the present invention. First, a modulated signal is generated, such as for digital transmission, step 510. The modulated signal has a signal envelope that varies in magnitude over time. In the preferred embodiment, a digital information stream is first mapped onto a symbol constellation, such as using a π/4 QPSK modulation scheme, to generate a sequence of channel symbols. A pulse shape filter is used to process the sequence of channel symbols, thereby generating a filtered modulated signal. The filtered modulated signal is a representative signal for the sequence of channel symbols.

Preferably, portions of the signal envelope are selected on which to compute minimum signal envelope values, step 520. In the preferred embodiment, the selected portions correspond to the intervals between two channel symbols occurring successively in the sequence of channel symbols. Minimum values are determined for each selected portion of the signal envelope, step 530. The minimum value corresponds to the minimum absolute magnitude of the selected portion of the signal envelope relative to an established baseline. Thus, the procedure operates to determine, with respect to a signal envelope representing the sequence of channel symbols, symbol interval minima corresponding to signal envelope transitions between successive channel symbols of the sequence.

When a selected portion has a minimum value below a minimum threshold, the window signal conditioner applies a window expansion function to scale the selected portion such that it has a new minimum value of at least the minimum threshold, steps 535, 540, 550. Preferably, the selected portion of the signal envelope is sampled to determine the minimum value, and to apply the window expansion function. In the preferred embodiment, samples are selected that reflect signal envelope values including, and immediately preceding and succeeding the part of the selected portion of the signal envelope having the minimum value, step 540. The number of samples selected defines the window length for the window expansion function. The window expansion function is applied to each of the samples to generate the conditioned modulated signal, step 550.

Preferably, only the magnitude of the signal envelope is affected by the window expansion function, and other aspects of the modulated signal remain unchanged. To avoid generating undesirable side effects, such as adjacent channel spectral spatter, the magnitude scaling preferably alters the signal envelope in a smooth, gradual manner. A window definition suitable for many applications, and used in the preferred embodiment, is the generalized Hanning-based window, h(n),which is given by, $$h(n) = \left(0.5 \times \left(1 - \cos \frac{2\pi n}{N-1}\right)\right)^k$$

where n is a sample number, N is the number of samples, and k is a predetermined decay rate of the desired pulse. A minima window function, w(n), is defined based on the Hanning window, h(n), and based on the desired minimum value or minimum threshold, $Min_d$, and the actual minimum value or symbol interval minimum, $Min_s$, determined for a particular selected portion of the signal envelope. The minima function, w(n), is defined as:

$$w(n) = 1 + \left(\frac{Min_d}{Min_s} - 1\right)h(n).$$

Figure 6:
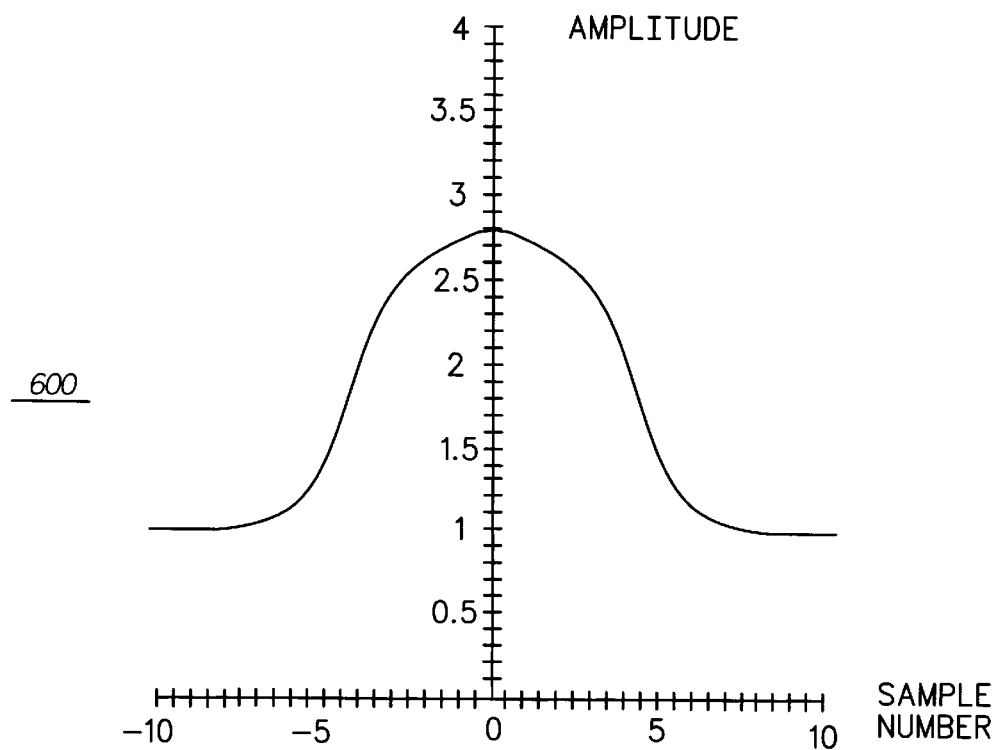
FIG. 6 is a graph illustrating a window function in accordance with the present invention.

FIG. 6 shows a graph 600 illustrating the behavior of the minima window function for $Min_d$=0.2, $Min_s$=0.07, and k=2. The graph has a horizontal axis of the sample number normalized such that the sample number at the minimum is zero. On the horizontal axis is the amplitude of the correction to be applied. The window length N is determined according to the rate at which the signal envelope magnitude fluctuates. A rapidly changing signal will warrant a narrow window to avoid scaling signal values that are large. Similarly, a slowly varying signal will require a wider window to accommodate the large number of small signal values expected at either side of that portion of the signal envelope corresponding to a minimum value.

The procedure is repeated until all symbol intervals in a particular sequence of channel symbols are checked for symbol interval minima less than the minimum threshold, and window expansion applied where appropriate, step 555. Additional processing may be performed, such as to normalize the conditioned signal to maintain the average power of the pre-conditioned signal. The functions of the above described procedure can be implemented in a digital signal processor by algorithm, such as in conjunction with a look-up table, with minimal impact on hardware design, modulation system design, and the like.

In the preferred embodiment, the procedure selectively applies a window algorithm to the filtered signal between successive symbols of the sequence of symbols to smoothly adjust a particular portion of the signal envelope above a minimum threshold, when the particular portion has a symbol interval minimum below the minimum threshold, thereby generating a conditioned signal. This in effect creates a "hole" around the origin for the signal envelope, i.e., no portion of the signal envelope crosses at or near the origin by the signal envelope. The hole is created without a significant adverse impact on performance parameters, such as signal transmission bandwidth.

Figure 7:
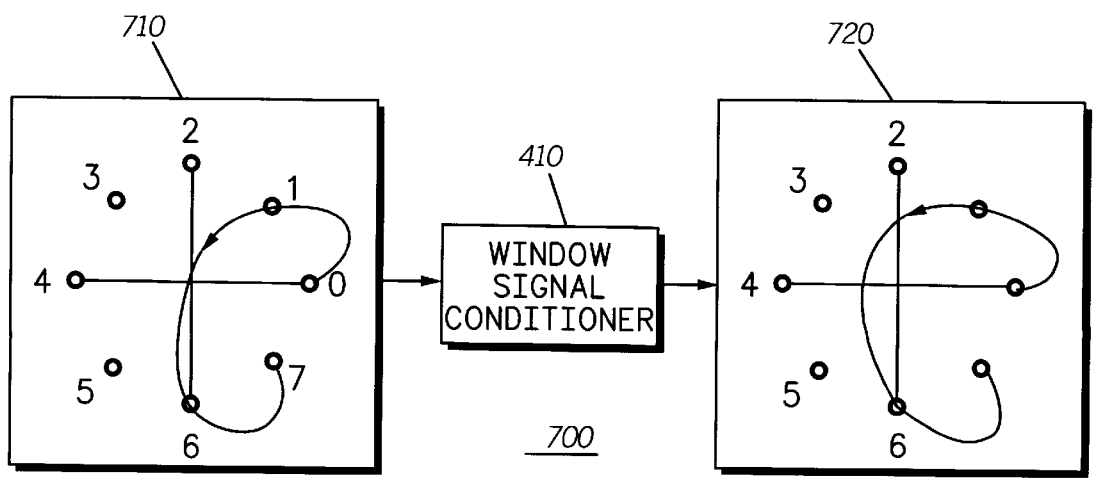
FIG. 7 is a diagram showing the impact on the signal envelope of a digitally modulated signal when processed in accordance with the present invention.

FIG. 7 shows a graph 700 highlighting, the transformation of the signal envelope after pulse shape filtering, when the window signal conditioner is used, in accordance with the present invention. Graph 710 shows how pulse shape filtered signal envelope transitions through the symbol sequence {0, 1, 6, 7} when the window signal conditioner is not used. Graph 720 shows how the pulse shaped filtered signal envelope transitions through the same sequence of symbols {0, 1, 6, 7} when the window signal conditioner is used. From graph 710, it is seen that the signal envelope passes close to the origin when transitioning on the symbol interval {1, 6}. Hence, the minimum value of the signal envelope, i.e., the symbol interval minimum is close to zero for the symbol interval {1, 6}.

According to the present invention, the window signal conditioner modifies or conditions a modulated signal, particularly one processed by a spectral shaping filter, to avoid signal envelope values for the modulated signal below a particular threshold. In the preferred embodiment, when a symbol interval minimum is below a minimum threshold, a window expansion function is applied to a portion of the signal envelope between the two channel symbols bordering the particular symbol interval minimum. In the example under discussion, the window expansion occurs between channel symbol {1} and channel symbol {6}. Thus, the resultant signal envelope avoids the origin by at least the minimum threshold amount.

The present invention provides a technique for removing extremely small signal envelope values for a modulated signal, thereby conditioning the modulated signal. In the preferred embodiment, a window expansion function is applied to a signal envelope representing the sequence of channel symbols to expand portions of the signal envelope to avoid symbol interval minima with values below a minimum threshold. While the discussion used the π/4 QPSK modulation scheme as an example, the concepts taught herein are equally applicable to other digital linear modulation schemes, and is not limited to any particular type of spectral shaping filter. Consider that the concepts could be applied to multiple channels or to a modulation scheme that utilizes multiple channels to transmit information. In such a system, the composite signal envelope can experience minimum values at or near symbol times, and the window expansion algorithm would be correspondingly modified to locate and adjust these minimum values.

The elimination of extremely small signal envelope minima provides significant benefits. For example, the use of the LINC power amplifier technique is facilitated by the creation of a signal envelope "hole" around the origin. This hole eliminates the need for extremely accurate phase resolution and reduces the bandwidth requirements in the LINC amplifier. In another example of a benefit, signal decoding is facilitated at a receiver processing a signal created according to the present invention. A differential phase detector sometimes utilized at the receiver is responsive to noise that can result in an error when the noise pushes the symbol transition to an opposite side of the origin. By moving the signal envelope away from the origin, the likelihood of this type of error is reduced.

What is claimed is:

1. A method of conditioning a signal for amplification, comprising the steps of:

providing a modulated signal having a signal envelope that varies in magnitude over time;

determining minimum values for the signal envelope;

applying a window expansion function to scale portions of the signal envelope having a minimum value below a particular threshold, such that each portion when scaled has a new minimum value of at least the particular threshold, thereby generating a conditioned signal; and processing the conditioned signal for amplification.

2. The method of claim 1, wherein the step of determining minimum values comprises the steps of:
   sampling a selected portion of the signal envelope to generate a plurality of samples; and
   determining a minimum value, $Min_s$, for a plurality of samples.

3. The method of claim 2, wherein the step of applying a window expansion function, comprises the step of applying a function to scale each of the plurality of samples to at least the particular threshold, $Min_d$, wherein the function is based on a generalized Hanning window function.

4. The method of claim 2, wherein the step of applying a window expansion function, comprises the step of applying a function w(n) to scale each of the plurality of samples to at least the particular threshold, $Min_d$, where:

$$w(n) = 1 + \left(\frac{Min_d}{Min_s} - 1\right)h(n);$$

$$h(n) = \left(0.5 \times \left(1 - \cos\frac{2\pi n}{N-1}\right)\right)^k;$$

N is total number of samples in the plurality of samples,
n is a sample number; and
k is a decay rate.

5. The method of claim 2, wherein the window expansion function is based on a function, w(n), applied to selected samples, where:

$$w(n) = 1 + \left(\frac{Min_d}{Min_s} - 1\right)h(n);$$

n is a sample number;
h(n) is a window function; and
$Min_d$ is the particular threshold.

6. A method for conditioning a digitally modulated signal, comprising the steps of:
   providing a sequence of channel symbols derived from a digital information stream mapped onto a symbol constellation;
   determining symbol interval minimum values for a signal envelope of a representative signal for the sequence of channel symbols when processed through a spectral shaping filter, as the signal envelope transitions between successive channel symbols of the sequence; and
   generating a conditioned signal by adjusting a portion of the signal envelope between first and second channel symbols of the sequence of channel symbols, using a window algorithm, wherein the portion of the signal envelope is scaled to increase a particular symbol interval minimum value when the particular symbol interval minimum value is below a minimum threshold.

7. The method of claim 6, wherein the window algorithm is based on a generalized Hanning window function, h(n), and a total of N samples of the signal envelope taken between the first and second channel symbols, where:

$$h(n) = \left(0.5 \times \left(1 - \cos\frac{2\pi n}{N-1}\right)\right)^k;$$

n is a sample number; and
k is a predetermined decay rate.

8. The method of claim 7, wherein the window algorithm is based on a function, w(n), applied to selected samples, where:

$$w(n) = 1 + \left(\frac{Min_d}{Min_s} - 1\right)h(n);$$

$Min_d$ is the minimum threshold; and
$Min_s$ is the particular symbol interval minimum value.

9. The method of claim 8, wherein the symbol constellation corresponds to a π/4 Quadrature Phase Shift Keying modulation scheme.

10. A method for processing a digital information stream in a digital transmitter, comprising the steps of:
    mapping the digital information stream onto a symbol constellation to generate a digitally modulated signal comprising a sequence of symbols;
    processing the digitally modulated signal with a spectral shaping filter to generate a filtered signal;
    determining, with respect to a signal envelope of the filtered signal, symbol interval minimum values, wherein a symbol interval minimum value corresponds to a minimum value of the signal envelope during a transition between two symbols occurring successively within the sequence;
    selectively applying a window algorithm to the filtered signal between successive symbols of the sequence of symbols to smoothly adjust a particular portion of the signal envelope above a minimum value threshold, when the particular portion has a symbol interval minimum value below the minimum value threshold, thereby generating a conditioned signal; and
    coupling the conditioned signal to an amplifier.

11. The method of claim 10, wherein the window algorithm is based on a generalized Hanning window function, h(n), and a total of N samples of the signal envelope taken between the first and second channel symbols, where:

$$h(n) = \left(0.5 \times \left(1 - \cos\frac{2\pi n}{N-1}\right)\right)^k;$$

n is a sample number; and
k is a predetermined decay rate.

12. The method of claim 11, wherein the window algorithm is based on a function, w(n), applied to selected samples, where:

$$w(n) = 1 + \left(\frac{Min_d}{Min_s} - 1\right)h(n);$$

$Min_d$ is the minimum value threshold; and
$Min_s$ is the symbol interval minimum value for the particular portion.

13. The method of claim 10, wherein the window algorithm is based on a function, w(n), applied to selected samples, where:

$$w(n) = 1 + \left(\frac{\text{Min}_d}{\text{Min}_s} - 1\right)h(n);$$

$n$ is a sample number;

$h(n)$ is a window function;

$\text{Min}_d$ is the minimum value threshold; and $\text{Min}_s$ is the symbol interval minimum value for the particular portion.

14. The method of claim 10, wherein the symbol constellation corresponds to a π/4 Quadrature Phase Shift Keying modulation scheme.

15. A digital transmitter, comprising:
    a digital information source providing a digital information signal;
    a channel symbol mapper coupled to the dfigital information source, and being operable to map the digital information signal to a sequence of channel symbols according to a symbol constellation, thereby generating a modulated signal;
    a pulse shape filter coupled to the channel symbol mapper and providing a filtered signal based on the modulated signal; and
    a signal conditioner coupled to the pulse shape filter, and being operable to determine, with respect to a signal envelope representing the sequence of channel symbols, symbol interval minima, wherein a symbol interval minimum corresponds to a minimum value of the signal envelope during a transition between first and second channel symbols occurring successively within the sequence, the signal conditioner being operable to adjust the signal envelope, by using a window algorithm to scale portions of the signal envelope to avoid symbol interval minima below a minima threshold, thereby generating a conditioned signal.

16. The digital transmitter of claim 15, wherein the window algorithm is based on a generalized Hanning window function, h(n), and N samples of the signal envelope taken between the first and second channel symbols, where:

$$h(n) = \left(0.5 \times \left(1 - \cos\frac{2\pi n}{N-1}\right)\right)^k;$$

$n$ is a sample number; and $k$ is a predetermined decay rate.

17. The digital transmitter of claim 16, wherein the window algorithm is based on a function, w(n), applied to each of the N samples, where:

$$w(n) = 1 + \left(\frac{\text{Min}_d}{\text{Min}_s} - 1\right)h(n);$$

$\text{Min}_d$ is the minima threshold; and $\text{Min}_s$ is a particular symbol interval minimum value.

18. The digital transmitter of claim 15, wherein the window algorithm is based on a function, w(n), applied to samples of the signal envelope, where:

$$w(n) = 1 + \left(\frac{\text{Min}_d}{\text{Min}_s} - 1\right)h(n);$$

$n$ is a sample number;

$h(n)$ is a window function;

$\text{Min}_d$ is the minima threshold; and $\text{Min}_s$ is a particular symbol interval minimum value.

19. The digital transmitter of claim 18, further comprising an amplifier coupled to the signal condition.

20. The digital transmitter of claim 19, wherein the symbol constellation corresponds to a π/4 QPSK modulation scheme.

* * * * *